United States Patent
Sugita

(10) Patent No.: US 10,879,004 B2
(45) Date of Patent: Dec. 29, 2020

(54) MULTILAYER CERAMIC CAPACITOR AND MULTILAYER CERAMIC CAPACITOR-MOUNTING STRUCTURE

(71) Applicant: Murata Manufacturing Co., Ltd., Nagaokakyo (JP)

(72) Inventor: Hiroaki Sugita, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 65 days.

(21) Appl. No.: 16/400,135

(22) Filed: May 1, 2019

(65) Prior Publication Data

US 2019/0371527 A1  Dec. 5, 2019

(30) Foreign Application Priority Data

Jun. 4, 2018  (JP) .................. 2018-106778

(51) Int. Cl.
*H01G 4/30* (2006.01)
*H01G 4/232* (2006.01)
*H01G 4/252* (2006.01)
*H01G 4/012* (2006.01)

(52) U.S. Cl.
CPC ............. *H01G 4/2325* (2013.01); *H01G 4/30* (2013.01); *H01G 4/012* (2013.01)

(58) Field of Classification Search
CPC ........ H01G 4/232; H01G 4/2325; H01G 4/30; H01G 4/252; H01G 4/012

USPC ......... 361/301.4, 306.1, 306.3, 321.1, 321.2, 361/321.3

See application file for complete search history.

(56) References Cited

U.S. PATENT DOCUMENTS

| 2002/0149901 A1 | 10/2002 | Shindo et al. |
| 2014/0177133 A1 | 6/2014 | Lee et al. |
| 2014/0226254 A1 | 8/2014 | Kim et al. |
| 2015/0243439 A1 | 8/2015 | Kwag |

FOREIGN PATENT DOCUMENTS

| CN | 104867673 A | 8/2015 |
| JP | 11-162771 A | 6/1999 |
| JP | 2002-260951 A | 9/2002 |
| JP | 2014-123698 A | 7/2014 |
| JP | 2014-154543 A | 8/2014 |

*Primary Examiner* — Arun Ramaswamy
(74) *Attorney, Agent, or Firm* — Keating & Bennett, LLP

(57) ABSTRACT

A multilayer ceramic capacitor includes a multilayer body which includes stacked dielectric layers, first and second principal surfaces facing each other, first and second end surfaces facing each other, first inner electrode layers alternately stacked with the dielectric layers and exposed on the first end surface, second inner electrode layers alternately stacked with the dielectric layers and exposed on the second end surface, a first outer electrode connected to the first inner electrode layers and disposed on the first end surface, and a second outer electrode connected to the second inner electrode layers and disposed on the second end surface.

20 Claims, 7 Drawing Sheets

SECTIONAL VIEW TAKEN ALONG LINE II-II

SECTIONAL VIEW TAKEN ALONG LINE III-III

SECTIONAL VIEW TAKEN ALONG LINE IV-IV $16\begin{cases}16a\\16b\end{cases}$  $18\begin{cases}18a\\18b\end{cases}$  $20\begin{cases}20a\\20b\end{cases}$  $28\begin{cases}28a\\28b\end{cases}$  $30\begin{cases}30a\\30b\end{cases}$

MULTILAYER CERAMIC CAPACITOR AND MULTILAYER CERAMIC CAPACITOR-MOUNTING STRUCTURE

CROSS REFERENCE TO RELATED APPLICATIONS

This application claims the benefit of priority to Japanese Patent Application No. 2018-106778 filed on Jun. 4, 2018. The entire contents of this application are hereby incorporated herein by reference.

BACKGROUND OF THE INVENTION

1. Field of the Invention

The present invention relates to a multilayer ceramic capacitor and a multilayer ceramic capacitor-mounting structure.

2. Description of the Related Art

In recent years, ceramic electronic components typified by multilayer ceramic capacitors have been used in harsher environments as compared to before.

For example, multilayer ceramic capacitors for use in mobile devices, such as mobile phones and portable music players, are required to resist drop impacts. In particular, it is necessary that a multilayer ceramic capacitor is not detached from any circuit board or is not cracked even if the multilayer ceramic capacitor is subjected to drop impacts.

Multilayer ceramic capacitors for use in on-vehicle devices, such as electronic control units (ECUs), are required to resist the impact of thermal cycles. In particular, it is necessary that a multilayer ceramic capacitor is not cracked even if the multilayer ceramic capacitor is subjected to flexure stress induced by the expansion and contraction of a circuit board subjected to thermal cycles.

To attempt to meet these requirements, it has been proposed that a thermosetting conductive resin paste is used to form outer electrodes of a multilayer ceramic capacitor. In, for example, Japanese Unexamined Patent Application Publication No. 11-162771, measures are taken to prevent a body of a multilayer ceramic capacitor from being cracked even in a harsh environment in such a manner that an epoxy thermosetting resin layer (resin outer electrode layer) is placed between a known electrode layer (base electrode layer) and a Ni coating.

In such a configuration, when stress is induced by drop impact or flexure stress is induced by the expansion and contraction of a circuit board subjected to thermal cycles, the stress applied to the circuit board (the strain of the circuit board) is reduced by causing delamination originating from the edge of the epoxy thermosetting resin layer (resin outer electrode layer) between the electrode layer (base electrode layer) and the epoxy thermosetting resin layer (resin outer electrode layer), such that the multilayer ceramic capacitor body is prevented from being cracked.

However, in such a design that the epoxy thermosetting resin layer (resin outer electrode layer) is placed between the electrode layer (base electrode layer) and the Ni coating as described in Japanese Unexamined Patent Application Publication No. 11-162771, there is a problem in that the equivalent series resistance (ESR) of the multilayer ceramic capacitor is high because the epoxy thermosetting resin layer (resin outer electrode layer) contains an epoxy thermosetting resin and therefore has high resistance and the contact resistance between the epoxy thermosetting resin layer (resin outer electrode layer) and the Ni coating is high.

Furthermore, as described in Japanese Unexamined Patent Application Publication No. 11-162771, the epoxy thermosetting resin layer (resin outer electrode layer) is placed on the electrode layer (base electrode layer), which is placed on the multilayer ceramic capacitor body, and therefore, an outer electrode has a large thickness. This leads to a problem in that a high-capacitance design is unlikely to be achieved because the multilayer ceramic capacitor body needs to be small in the case in which the multilayer ceramic capacitor is adjusted to a standard size.

SUMMARY OF THE INVENTION

Preferred embodiments of the present invention provide multilayer ceramic capacitors and multilayer ceramic capacitor-mounting structures in each of which cracking is able to be reduced or prevented, ESR is able to be reduced, and high capacitance is able to be achieved.

A multilayer ceramic capacitor according to a preferred embodiment of the present invention includes a multilayer body that includes a plurality of stacked dielectric layers, a first principal surface, a second principal surface facing the first principal surface in a height direction, a first side surface, a second side surface facing the first side surface in a width direction perpendicular or substantially perpendicular to the height direction, a first end surface, and a second end surface facing the first end surface in a length direction perpendicular or substantially perpendicular to the height direction and the width direction; a plurality of first inner electrode layers that are alternately stacked with the dielectric layers and that are exposed on the first end surface; a plurality of second inner electrode layers that are alternately stacked with the dielectric layers and exposed on the second end surface; a first outer electrode that is connected to the first inner electrode layers and disposed on the first end surface; and a second outer electrode that is connected to the second inner electrode layers and disposed on the second end surface. The first outer electrode includes a first resin outer electrode layer containing a thermosetting resin and a conductive filler and a first base electrode layer containing glass and a conductive metal. The second outer electrode includes a second resin outer electrode layer containing a thermosetting resin and a conductive filler and a second base electrode layer containing glass and a conductive metal. The first resin outer electrode layer directly covers about one half of the first end surface. The second resin outer electrode layer directly covers about one half of the second end surface. The first base electrode layer directly covers about another half of the first end surface. The second base electrode layer directly covers about another half of the second end surface.

With the multilayer ceramic capacitor described above, since the first resin outer electrode layer and the second resin outer electrode layer directly cover about one half of the first end surface and about one half of the second end surface, respectively, a region in which each of the first and second resin outer electrode layers, which contain a thermosetting resin having high resistance, is disposed is able to be reduced over the first and second outer electrodes. Therefore, ESR is able to be reduced over the first and second outer electrodes.

Since the first resin outer electrode layer, the second resin outer electrode layer, the first base electrode layer, and the second base electrode layer are disposed directly on the multilayer body, the thicknesses of the first and second outer electrodes are reduced, thus enabling a high-capacitance design to be achieved.

As a result, in preferred embodiments of the present invention, the multilayer ceramic capacitors and the multilayer ceramic capacitor-mounting structures are each able to be provided such that cracking is able to be reduced or prevented, ESR is able to be reduced, and high capacitance is able to be achieved.

A multilayer ceramic capacitor-mounting structure according to a preferred embodiment of the present invention includes a multilayer ceramic capacitor including a multilayer body that includes a plurality of stacked dielectric layers, a first principal surface, a second principal surface facing the first principal surface in a height direction, a first side surface, a second side surface facing the first side surface in a width direction perpendicular or substantially perpendicular to the height direction, a first end surface, and a second end surface facing the first end surface in a length direction perpendicular or substantially perpendicular to the height direction and the width direction; a plurality of first inner electrode layers that are alternately stacked with the dielectric layers and exposed on the first end surface; a plurality of second inner electrode layers that are alternately stacked with the dielectric layers and exposed on the second end surface; a first outer electrode that is connected to the first inner electrode layers and disposed on the first end surface; and a second outer electrode that is connected to the second inner electrode layers and disposed on the second end surface, the first outer electrode including a first resin outer electrode layer containing a thermosetting resin and a conductive filler and a first base electrode layer containing glass and a conductive metal, the second outer electrode including a second resin outer electrode layer containing a thermosetting resin and a conductive filler and a second base electrode layer containing glass and a conductive metal, the first resin outer electrode layer directly covering about one half of the first end surface, the second resin outer electrode layer directly covering about one half of the second end surface, the first base electrode layer directly covering about another half of the first end surface, the second base electrode layer directly covering about another half of the second end surface, and also includes a circuit board on which the multilayer ceramic capacitor is mounted. The first inner electrode layers and the second inner electrode layers are parallel or substantially parallel to the first side surface and the second side surface and perpendicular or substantially perpendicular to a mounting surface. The first resin outer electrode layer that directly covers about one half of the first end surface is disposed on the mounting surface side. The second resin outer electrode layer that directly covers about one half of the second end surface is disposed on the mounting surface side. The first base electrode layer that directly covers about another half of the first end surface is disposed opposite to the mounting surface. The second base electrode layer that directly covers about another half of the second end surface is disposed opposite to the mounting surface. The circuit board includes a core member and mounting lands disposed on a surface of the core member. The mounting lands are connected to the first outer electrode and the second outer electrode with a bonding material.

With the multilayer ceramic capacitor-mounting structure described above, the first and second resin outer electrode layers are disposed on the mounting surface side. Therefore, when stress is induced by drop impacts or flexure stress is induced by the expansion and contraction of a circuit board subjected to thermal cycles, the stress applied to the circuit board (the strain of the circuit board) is able to be reliably reduced with the first and second resin outer electrode layers. Thus, cracks are able to be reduced or prevented from occurring in the multilayer ceramic capacitor.

Since the first and second inner electrode layers are perpendicular or substantially perpendicular to the mounting surface, all extended electrode sections are electrically continuous with the first and second base electrode layers, which have high conductivity, and therefore, a reduction in electrostatic capacitance due to poor contact is able to be reduced or prevented.

According to preferred embodiments of the present invention, multilayer ceramic capacitors and multilayer ceramic capacitor-mounting structures are able to be provided such that cracking is able to be reduced or prevented, ESR is able to be reduced, and high capacitance is able to be achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are described below with reference to the accompanying drawings.

Figure 1:
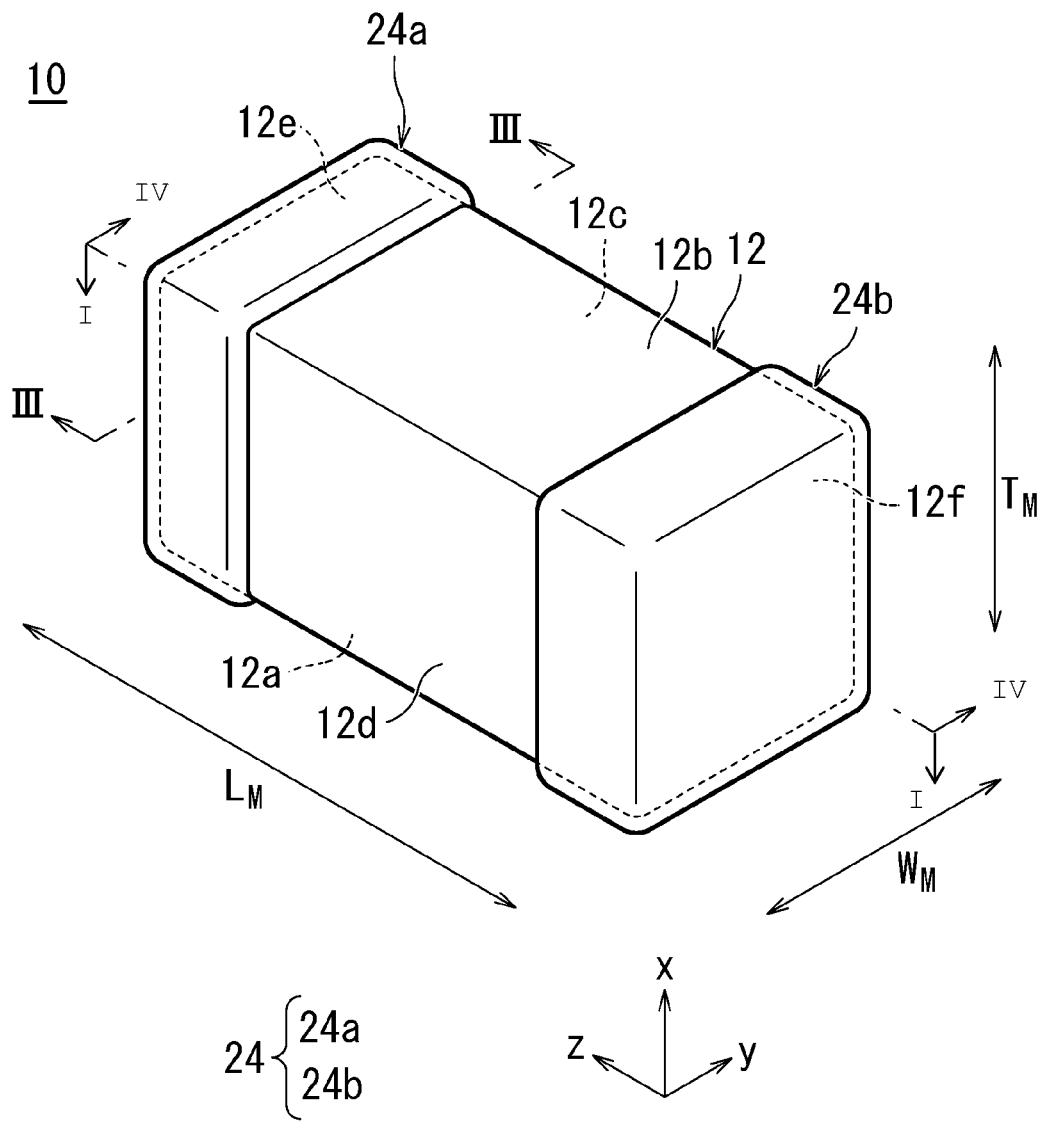
FIG. 1 is a perspective view of a multilayer ceramic capacitor according to a preferred embodiment of the present invention.
Figure 2:
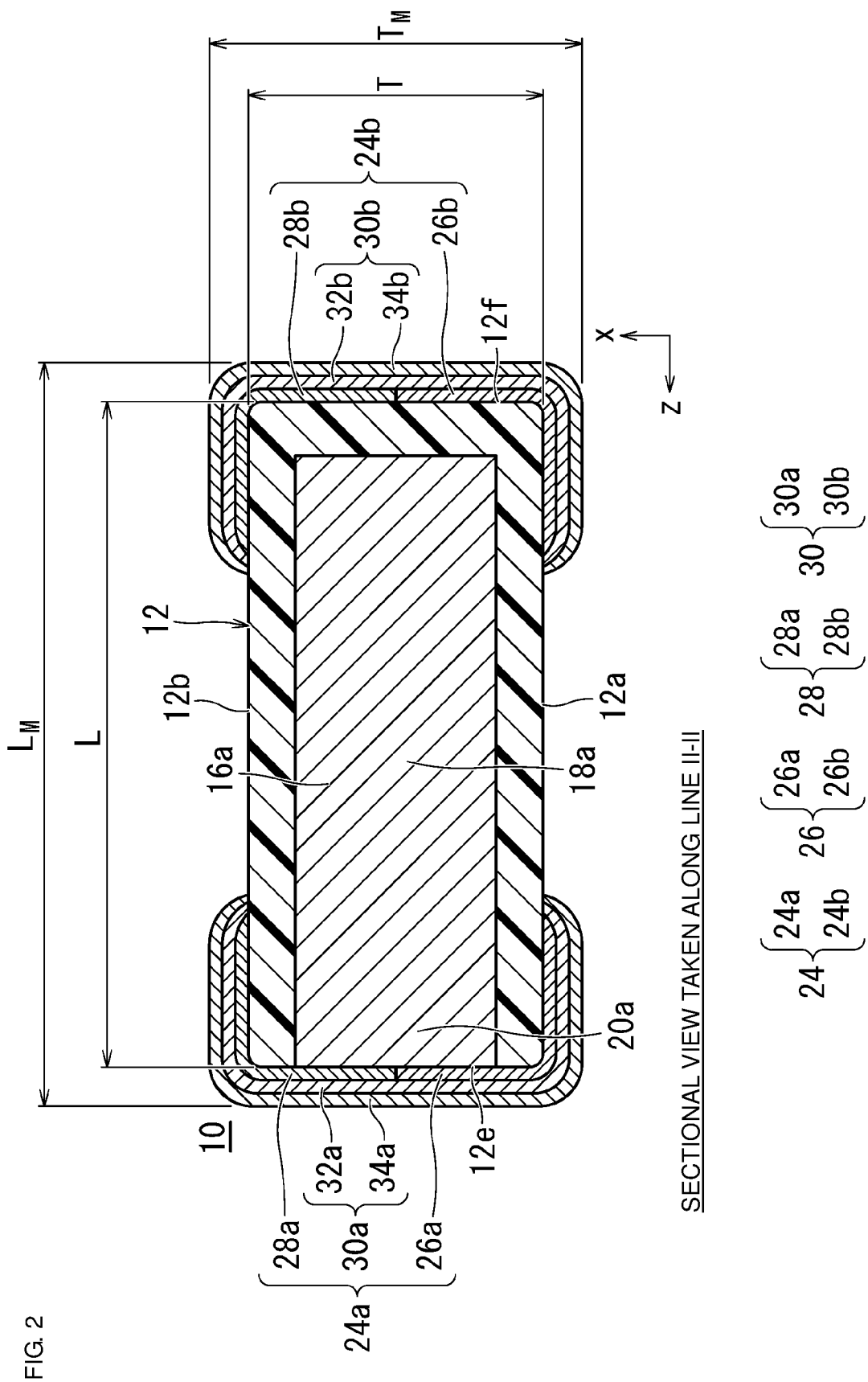
FIG. 2 is a sectional view of the multilayer ceramic capacitor taken along the line II-II of FIG. 1.

A multilayer ceramic capacitor 10 according to a preferred embodiment of the present invention is described with reference to FIGS. 1 to 5A, 5B, and 5C. FIG. 1 is an outline perspective view of an example of the multilayer ceramic capacitor 10. FIG. 2 is a sectional view of the multilayer ceramic capacitor 10 taken along the line II-II of FIG. 1.

Figure 3:
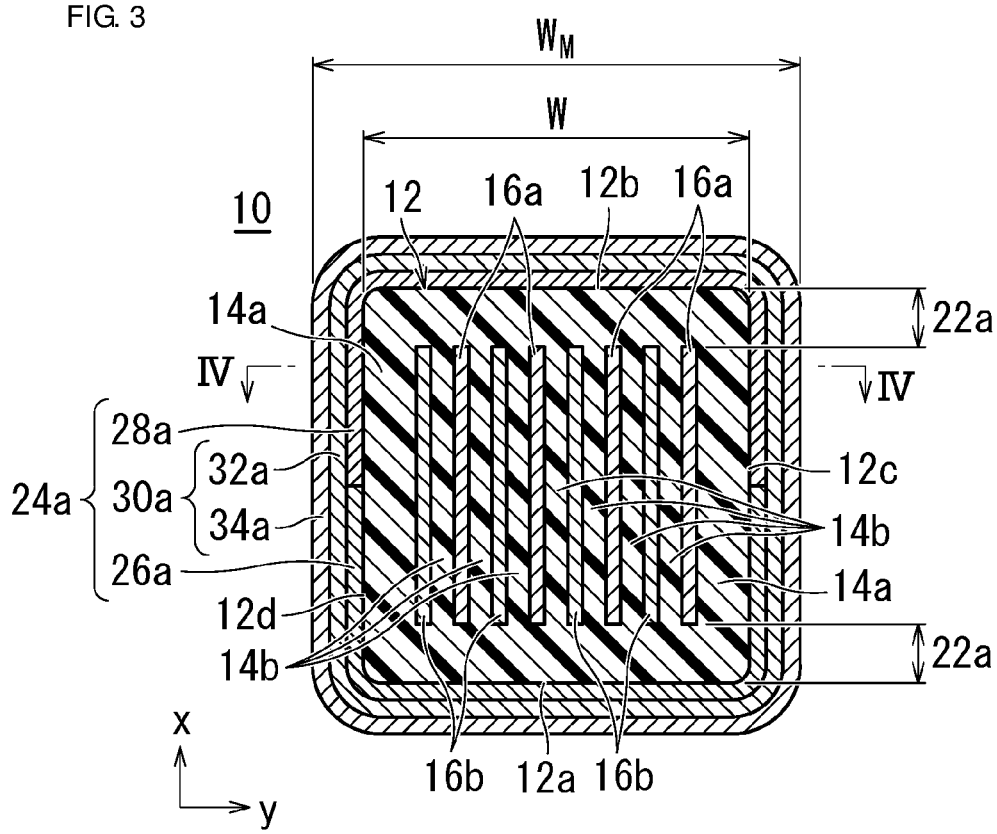
FIG. 3 is a sectional view of the multilayer ceramic capacitor taken along the line III-III of FIG. 1.
Figure 4:
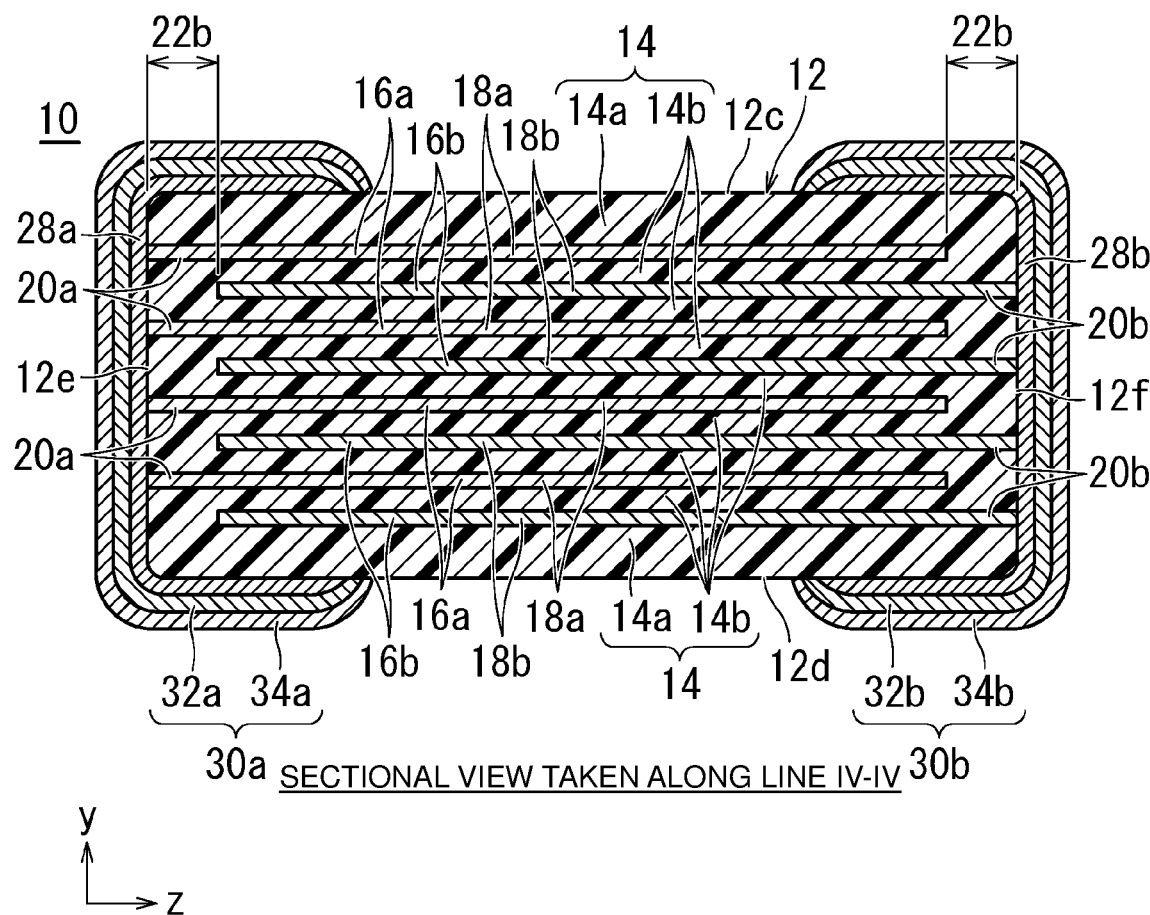
FIG. 4 is a sectional view of the multilayer ceramic capacitor taken along the line IV-IV of FIG. 1.
Figure 5A:
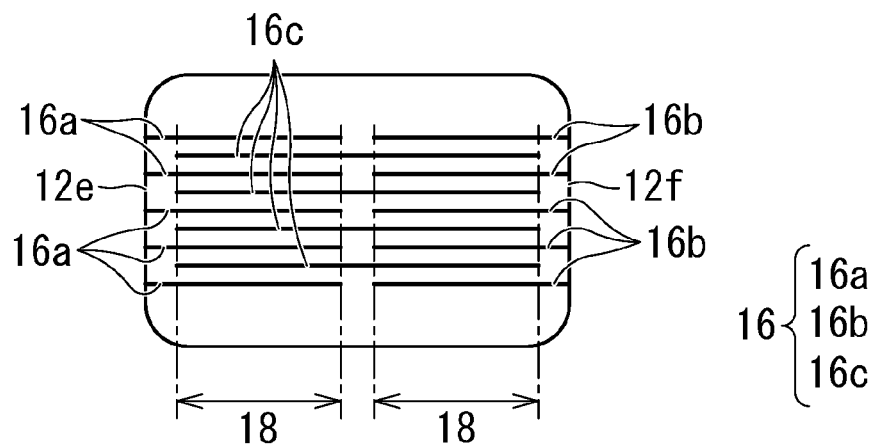
FIG. 5A is an illustration showing a structure in which each inner electrode layer of a multilayer body in a multilayer ceramic capacitor according to another preferred embodiment of the present invention includes two divided facing electrode sections.
Figure 5B:
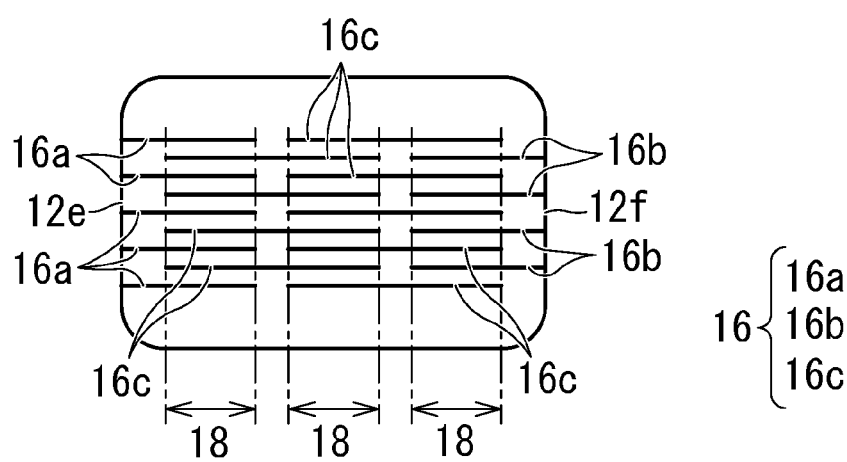
FIG. 5B is an illustration showing a structure in which each inner electrode layer of a multilayer body in a multilayer ceramic capacitor according to another preferred embodiment of the present invention includes three divided facing electrode sections.
Figure 5C:
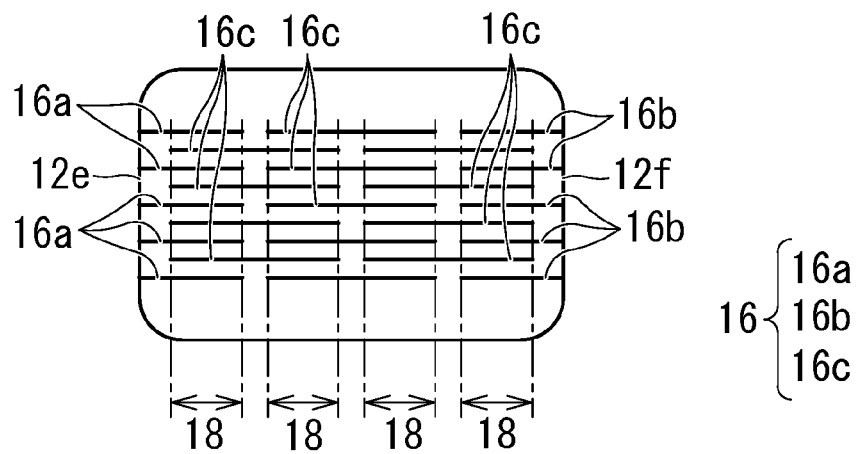
FIG. 5C is an illustration showing a structure in which each inner electrode layer of a multilayer body in a multilayer ceramic capacitor according to another preferred embodiment of the present invention includes four divided facing electrode sections.

FIG. 3 is a sectional view of the multilayer ceramic capacitor 10 taken along the line III-III of FIG. 1. FIG. 4 is a sectional view of the multilayer ceramic capacitor 10 taken along the line IV-IV of FIG. 1. FIG. 5A is an illustration showing a structure in which each inner electrode layer of a multilayer body in a multilayer ceramic capacitor according to another preferred embodiment of the present invention includes two divided facing electrode sections. FIG. 5B is an illustration showing a structure in which each inner electrode layer of a multilayer body in a multilayer ceramic capacitor according to another preferred embodiment of the present invention includes three divided facing electrode sections. FIG. 5C is an illustration showing a structure in which each inner electrode layer of a multilayer body in a multilayer ceramic capacitor according to another preferred embodiment of the present invention includes four divided facing electrode sections.

As shown in FIGS. 1 to 4, the multilayer ceramic capacitor 10 includes a multilayer body 12 preferably having a cuboid or substantially cuboid shape.

The multilayer body 12 includes a plurality of stacked dielectric layers 14 and a plurality of stacked inner electrode layers 16, a first principal surface 12a, a second principal surface 12b facing the first principal surface 12a in a height direction x, a first side surface 12c, a second side surface 12d facing the first side surface 12c in a width direction y perpendicular or substantially perpendicular to the height direction x, a first end surface 12e, and a second end surface 12f facing the first end surface 12e in a length direction z perpendicular or substantially perpendicular to the height direction x and the width direction y. The multilayer body 12 preferably includes rounded corner sections and rounded edge sections. The term "corner section" refers to a section at which three adjacent surfaces of the multilayer body 12 intersect. The term "edge section" refers to a section at which two adjacent surfaces of the multilayer body 12 intersect. The first principal surface 12a, the second principal surface 12b, the first side surface 12c, the second side surface 12d, the first end surface 12e, and the second end surface 12f may be partially or entirely irregular.

Dimensions of the multilayer body 12 are preferably, for example, as follows: the dimension L between the first and second end surfaces 12e and 12f in the length direction z is about 0.185 mm to about 3.400 mm, the dimension W between the first and second side surfaces 12c and 12d in the width direction y is about 0.090 mm to about 2.600 mm, and the dimension T between the first and second principal surfaces 12a and 12b in the height direction x is about 0.090 mm to about 2.600 mm.

The dielectric layers 14 include outer layer sections 14a and a plurality of inner layer sections 14b interposed between the inner electrode layers 16. The outer layer sections 14a include a plurality of the dielectric layers 14 that are stacked. The outer layer sections 14a are located on the first principal surface 12a side and second principal surface 12b side of the multilayer body 12 and between the first side surface 12c, the second side surface 12d, and the inner electrode layers 16 that are closest to the first principal surface 12a and the second principal surface 12b. The inner layer sections 14b are interposed between the outer layer sections 14a.

For example, a dielectric ceramic containing a main component such as $BaTiO_3$, $CaTiO_3$, $SrTiO_3$, or $CaZrO_3$ may preferably be used as a ceramic material for the dielectric layers 14 of the multilayer body 12. Furthermore, one obtained by adding a minor component, such as a Mn compound, an Fe compound, a Cr compound, a Co compound, or a Ni compound, for example, to the major component may preferably be used.

The dielectric layers 14 preferably have a thickness of about 0.4 μm to about 20 μm, for example. The number of the dielectric layers 14 is preferably about 11 to about 1,400, for example, including the outer layer sections 14a. The outer layer sections 14a preferably have a thickness of about 20 μm to about 200 μm, for example.

The inner electrode layers 16 include a plurality of first inner electrode layers 16a which are alternately stacked with the dielectric layers 14 and which are exposed on the first end surface 12e and a plurality of second inner electrode layers 16b which are alternately stacked with the dielectric layers 14 and which are exposed on the second end surface 12f. The first inner electrode layers 16a and the second inner electrode layers 16b are preferably parallel or substantially parallel to the first side surface 12c and the second side surface 12d. However, the first inner electrode layers 16a and the second inner electrode layers 16b may be parallel or substantially parallel to the first principal surface 12a and the second principal surface 12b.

Each first inner electrode layer 16a includes a first facing electrode section 18a facing the second inner electrode layers 16b and a first extended electrode section 20a extending from the first facing electrode section 18a to the first end surface 12e of the multilayer body 12. The first extended electrode section 20a of the first inner electrode layer 16a includes an end portion which is extended to the first end surface 12e of the multilayer body 12 and defines an exposed portion.

Each second inner electrode layer 16b includes a second facing electrode section 18b facing the first inner electrode layer 16a and a second extended electrode section 20b extending from the second facing electrode section 18b to the second end surface 12f of the multilayer body 12. The second extended electrode section 20b of the second inner electrode layer 16b includes an end portion which is extended to the second end surface 12f of the multilayer body 12 and defines an exposed portion.

A facing electrode section 18 includes the first facing electrode section 18a of the first inner electrode layer 16a and the second facing electrode section 18b of the second inner electrode layer 16b. The shape of each of the first and second facing electrode sections 18a and 18b is not particularly limited and is preferably cuboidal or substantially cuboidal, for example. The first and second facing electrode sections 18a and 18b may include, for example, rounded corner portions or tapered corner portions.

An extended electrode section 20 includes the first extended electrode section 20a of the first inner electrode layer 16a and the second extended electrode section 20b of the second inner electrode layer 16b. The shape of each of the first and second extended electrode sections 20a and 20b is not particularly limited and is preferably cuboidal or substantially cuboidal, for example. The first and second extended electrode sections 20a and 20b may include, for example, rounded corner portions or tapered corner portions.

The thickness of each of the first facing electrode section 18a of the first inner electrode layer 16a and the second facing electrode section 18b of the second inner electrode layer 16b may preferably be the same or substantially the same as the thickness of each of the first extended electrode section 20a of the first inner electrode layer 16a and the second extended electrode section 20b of the second inner electrode layer 16b. Alternatively, the thickness of one may be less than the thickness of the other.

The multilayer body 12 includes side sections 22a (W gaps) each of which is located between the second principal surface 12b and the inner electrode layers 16 or between the first principal surface 12a and the inner electrode layers 16, and end sections 22b (L gaps) each of which is located between the first end surface 12e and the second facing electrode section 18b or between the second end surface 12f and the first facing electrode section 18a and each of which include the first extended electrode sections 20a or the second extended electrode sections 20b.

As shown in FIGS. 5A to 5C, the inner electrode layers 16 include floating inner electrode layers 16c not extending to the first end surface 12e or the second end surface 12f and may have a structure in which each of the facing electrode sections 18 is divided into a plurality of portions by the floating inner electrode layers 16c. The inner electrode layers 16 may have, for example, a dyad structure (refer to FIG. 5A), a triad structure (refer to FIG. 5B), or a tetrad structure (refer to FIG. 5C). The inner electrode layers 16 may have a more than tetrad structure. Dividing each facing electrode section 18 into a plurality of portions as described above enables a plurality of capacitor components to be provided between the facing inner electrode layers 16, thus obtaining a configuration in which the capacitor components are connected in series. Therefore, the voltage applied to each of the capacitor components is low and an increase in dielectric strength of the multilayer ceramic capacitor 10 is able to be achieved.

The first inner electrode layers 16a and the second inner electrode layers 16b may preferably be made of, for example, metal such as Ni, Cu, Ag, Pd, or Au or an appropriate conductive material such as an Ag—Pd alloy or an alloy containing such metal.

In the present preferred embodiment, the first facing electrode sections 18a and the second facing electrode sections 18b face each other with the dielectric layers 14 therebetween, thus electrostatic capacitors are provided and capacitor characteristics are obtained.

The first inner electrode layers 16a and the second inner electrode layers 16b preferably have a thickness of about 0.2 μm to about 2.0 μm, for example. The number of the first and second inner electrode layers 16a and 16b are preferably about 10 to about 1,400, for example.

Outer electrodes 24 include a first outer electrode 24a which is connected to the first inner electrode layers 16a and disposed on the first end surface 12e and a second outer electrode 24b which is connected to the second inner electrode layers 16b and disposed on the second end surface 12f.

The first outer electrode 24a includes a first resin outer electrode layer 26a containing a thermosetting resin and a conductive filler and a first base electrode layer 28a containing glass and a conductive metal.

The second outer electrode 24b includes a second resin outer electrode layer 26b containing a thermosetting resin and a conductive filler and a second base electrode layer 28b containing glass and a conductive metal.

A resin outer electrode layer 26 includes the first resin outer electrode layer 26a and the second resin outer electrode layer 26b. The first resin outer electrode layer 26a directly covers about one half of the first end surface 12e. The second resin outer electrode layer 26b directly covers about one half of the second end surface 12f. This enables a region in which the resin outer electrode layer 26, which contains a thermosetting resin with high resistance, is disposed to be reduced over the outer electrodes 24 because the resin outer electrode layer 26 directly covers about one half of the first end surface 12e and about one half of the second end surface 12f. Therefore, ESR is able to be reduced over the outer electrodes 24. The resin outer electrode layer 26 is disposed directly on the multilayer body 12, and therefore, the outer electrodes 24 are able to have reduced thicknesses. Therefore, the multilayer body 12 is able to be designed such that a high-capacitance design is achieved. As a result, in the present preferred embodiment, the multilayer ceramic capacitor 10 is able to be provided such that cracking is able to be reduced or prevented, ESR is able to be reduced, and high capacitance is able to be achieved.

Referring to FIGS. 2 and 3, the first end surface 12e and the second end surface 12f are divided into two portions in the height direction x. How to divide the first end surface 12e and the second end surface 12f is not limited. Thus, the first end surface 12e and the second end surface 12f may be divided into two portions in the width direction y.

The first resin outer electrode layer 26a preferably extends from the first end surface 12e to a portion of the first principal surface 12a, a portion of the first side surface 12c, and a portion of the second side surface 12d. The second resin outer electrode layer 26b preferably extends from the second end surface 12f to a portion of the first principal surface 12a, a portion of the first side surface 12c, and a portion of the second side surface 12d. This enables the stress applied to a circuit board (the strain of the circuit board) to be reduced with the resin outer electrode layer 26, which is disposed on a portion of the first principal surface 12a, a portion of the first side surface 12c, and a portion of the second side surface 12d, even when stress is induced by the impact of a fall of an electronic device provided with the multilayer ceramic capacitor 10 or flexure stress is induced by the expansion and contraction of the circuit board subjected to thermal cycles. Thus, cracks are able to be effectively reduced or prevented from occurring in the multilayer ceramic capacitor 10.

A central portion in a height direction of the first resin outer electrode layer 26a (in particular, a portion located at about half the height of the first resin outer electrode layer 26a) that is located on the first end surface 12e preferably has a thickness of about 5 μm to about 30 μm, for example. A central portion in a height direction of the second resin outer electrode layer 26b (in particular, a portion located at about half the height of the second resin outer electrode layer 26b) that is located on the second end surface 12f preferably has a thickness of about 5 μm to about 30 μm, for example.

When the first resin outer electrode layer 26a and the second resin outer electrode layer 26b extend to a portion of the first principal surface 12a, a portion of the first side surface 12c, and a portion of the second side surface 12d, a longitudinal central portion of the first resin outer electrode layer 26a that is located on the first principal surface 12a preferably has a thickness of about 1 μm to about 15 μm, for example, a longitudinal central portion of the first resin outer electrode layer 26a that is located on the first side surface 12c preferably has a thickness of about 1 μm to about 15 μm, for example, and a longitudinal central portion of the first resin outer electrode layer 26a that is located on the second side surface 12d preferably has a thickness of about 1 μm to about 15 μm, for example. Furthermore, a longitudinal central portion of the second resin outer electrode layer 26b that is located on the first principal surface 12a preferably has a thickness of about 1 μm to about 15 μm, for example, a longitudinal central portion of the second resin outer electrode layer 26b that is located on the first side surface 12c preferably has a thickness of about 1 μm to about 15 μm, for example, and a longitudinal central portion of the second resin outer electrode layer 26b that is located on the second side surface 12d preferably has a thickness of about 1 μm to about 15 μm, for example.

The first resin outer electrode layer 26a and the second resin outer electrode layer 26b contain a thermosetting resin and a metal material defining a conductive filler.

Since the first resin outer electrode layer 26a and the second resin outer electrode layer 26b contain the thermosetting resin, the first resin outer electrode layer 26a and the second resin outer electrode layer 26b are more flexible than, for example, plating films and conductive layers made of a fired product of a conductivity paste. Therefore, even when a physical impact or impact due to thermal cycles is applied to the multilayer ceramic capacitor 10, the resin outer electrode layer 26 defines and function as a buffer layer to prevent cracks from occurring in the multilayer ceramic capacitor 10.

Examples of the thermosetting resin contained in the first resin outer electrode layer 26a and the second resin outer electrode layer 26b include various known thermosetting resins such as an epoxy resin, a phenol resin, a urethane resin, a silicone resin, and a polyimide resin. In particular, the epoxy resin is excellent in heat resistance, humidity resistance, and adhesion and is one of the more preferable resins.

The resin outer electrode layer 26 preferably contains a curing agent in addition to the thermosetting resin. In the case of using the epoxy resin as a base resin, various known compounds such as phenols, amines, acid anhydrides, and imidazoles, for example, may preferably be used as a curing agent for the epoxy resin.

The conductive filler contained in the first resin outer electrode layer 26a and the second resin outer electrode layer 26b may preferably be Ag, Cu, or an alloy of Ag or Cu, for example. Alternatively, metal particles surface-coated with Ag may be used. In the case of using the metal particles surface-coated with Ag, the metal particles preferably contain Cu or Ni, for example. Alternatively, Cu subjected to an anti-oxidation treatment may be used.

The metal material, which defines and functions as a conductive filler, contained in the resin outer electrode layer 26 may contain a plurality of types of metals or may be composed of, for example, a first metal component and a second metal component. The first metal component is preferably made of, for example, Sn, In, Bi, or an alloy containing at least one of Sn, In, and Bi. In particular, the first metal component is preferably made of Sn or an alloy containing Sn, for example. Examples of the alloy containing Sn include Sn—Ag, Sn—Bi, and Sn—Ag—Cu. The second metal component is preferably made of, for example, Cu, Ag, Pd, Pt, Au, or an alloy containing at least one of Cu, Ag, Pd, Pt, and Au. In particular, the second metal component is preferably Cu or Ag, for example.

The reason why a conductive metal powder containing Ag is preferably used in the metal material, which defines and functions as a conductive filler, is that Ag has the lowest resistivity among metals, is therefore suitable for an electrode material, is a noble metal, is therefore not oxidized, and has high weather-resistance. The reason why metal coated with Ag is preferably used is that the above properties of Ag are maintained and metal in a parent material is able to be obtained at low cost.

The metal material, which defines and functions as a conductive filler, contained in the resin outer electrode layer 26 mainly ensures the conductivity of the resin outer electrode layer 26. In particular, conductive paths are provided in the resin outer electrode layer 26 such that particles of the conductive filler are brought into contact with each other.

A base electrode layer 28 includes the first base electrode layer 28a and the second base electrode layer 28b. The first base electrode layer 28a directly covers about another half of the first end surface 12e. The second base electrode layer 28b directly covers about another half of the second end surface 12f. In particular, in the first end surface 12e, the first base electrode layer 28a is disposed opposite to the first resin outer electrode layer 26a. In the second end surface 12f, the second base electrode layer 28b is disposed opposite to the second resin outer electrode layer 26b. This enables the region in which the resin outer electrode layer 26, which contains the thermosetting resin with high resistance, is disposed to be reduced over the outer electrodes 24. Therefore, ESR is able to be reduced over the outer electrodes 24. The resin outer electrode layer 26 need not be disposed on the base electrode layer 28, and therefore, the outer electrodes 24 are able to be reduced in thickness. Therefore, the multilayer body 12 is able to be designed such that a high-capacitance design is achieved. As a result, in the present preferred embodiment, the multilayer ceramic capacitor 10 is able to be provided such that cracking is able to be reduced or prevented, ESR is able to be reduced, and high capacitance is able to be achieved.

The first base electrode layer 28a preferably extends from the first end surface 12e to a portion of the second principal surface 12b, a portion of the first side surface 12c, and a portion of the second side surface 12d. The second base electrode layer 28b preferably extends from the second end surface 12f to a portion of the second principal surface 12b, a portion of the first side surface 12c, and a portion of the second side surface 12d. This enables the base electrode layer 28 to have an improved ability to seal the multilayer body 12 and, therefore, enables the humidity resistance reliability of the multilayer ceramic capacitor 10 to be increased.

The first base electrode layer 28a and the second base electrode layer 28b are formed by applying and baking, for example, a conductive paste containing a conductive metal and a glass component. A ceramic material that is the same or substantially the same type as the dielectric layers 14 may preferably be used, instead of the glass component.

The glass component included in the first base electrode layer 28a and the second base electrode layer 28b, may preferably be, for example, glass containing B, Si, Ba, Mg, Al, Li, or other suitable material.

The conductive metal included in the first base electrode layer 28a and the second base electrode layer 28b, may be preferably, for example, Cu, Ni, Ag, Pd, an Ag—Pd alloy, Au, or other suitable material.

The first base electrode layer 28a and the second base electrode layer 28b may be obtained by co-firing with the inner electrode layer 16 or by applying and baking the conductive paste. In particular, in the case of co-firing with the inner electrode layer 16, the ceramic material that is the same or substantially the same type as the dielectric layers 14 is preferably used instead of the glass component.

A central portion in a height direction of the first base electrode layer 28a (in particular, a portion located at about half the height of the first base electrode layer 28a) that is located on the first end surface 12e preferably has a thickness of about 5 μm to about 30 μm, for example. A central portion in a height direction of the second base electrode layer 28b (in particular, a portion located at about half the height of the second base electrode layer 28b) that is located on the second end surface 12f preferably has a thickness of about 5 μm to about 30 μm, for example.

When the first base electrode layer 28a and the second base electrode layer 28b extend to a portion of the second principal surface 12b, a portion of the first side surface 12c, and a portion of the second side surface 12d, a longitudinal central portion of the first base electrode layer 28a that is located on the second principal surface 12b preferably has a thickness of about 1 μm to about 15 μm, for example, a longitudinal central portion of the second base electrode layer 28b that is located on the first side surface 12c preferably has a thickness of about 1 μm to about 15 μm, for example, and a longitudinal central portion of the second base electrode layer 28b that is located on the second side surface 12d preferably has a thickness of about 1 μm to about 15 μm, for example. Furthermore, a longitudinal central portion of the second base electrode layer 28b that is located on the second principal surface 12b preferably has a thickness of about 1 μm to about 15 μm, for example, a longitudinal central portion of the second base electrode layer 28b that is located on the first side surface 12c preferably has a thickness of about 1 μm to about 15 μm, for example, and a longitudinal central portion of the second base electrode layer 28b that is located on the second side surface 12d preferably has a thickness of about 1 μm to about 15 μm, for example.

The first outer electrode 24a further includes a first plating layer 30a. The first plating layer 30a covers the first resin outer electrode layer 26a and the first base electrode layer 28a. The second outer electrode 24b further includes a second plating layer 30b. The second plating layer 30b covers the second resin outer electrode layer 26b and the second base electrode layer 28b. This enables the humidity resistance reliability of the first and second outer electrodes 24a and 24b to be increased and also enables mountability during circuit board mounting to be increased. A plating layer 30 preferably includes the first plating layer 30a and the second plating layer 30b.

The plating layer 30 preferably contains, for example, at least one selected from the group consisting of Cu, Ni, Ag, Pd, an Ag—Pd alloy, and Au.

The plating layer 30 may include a plurality of layers. The plating layer 30 preferably includes two layers: a Ni plating layer 32 and a Sn plating layer 34, for example. The Ni plating layer 32 prevents the base electrode layer 28 from being eroded by solder used to mount the multilayer ceramic capacitor 10. The Sn plating layer 34 increases the wettability of the solder used to mount the multilayer ceramic capacitor 10, thus enabling the multilayer ceramic capacitor 10 to be easily mounted.

The following portions preferably have a thickness of, for example, about 1 μm to about 10 μm: a central portion in a height direction of a first Ni plating layer 32a that is located on the first end surface 12e, a central portion in a height direction of the first Ni plating layer 32a that is located on the second end surface 12f, a central portion in a height direction of a second Ni plating layer 32b that is located on the first end surface 12e, and a central portion in a height direction of the second Ni plating layer 32b that is located on the second end surface 12f. When a first Sn plating layer 34a and a second Sn plating layer 34b are disposed on the first principal surface 12a, second principal surface 12b, the first side surface 12c, and the second side surface 12d, the following portions preferably have a thickness of, for example, about 1 μm to about 10 μm: a longitudinal central portion of the first Sn plating layer 34a that is located on the first principal surface 12a, a longitudinal central portion of the first Sn plating layer 34a that is located on the second principal surface 12b, a longitudinal central portion of the first Sn plating layer 34a that is located on the first side surface 12c, a longitudinal central portion of the first Sn plating layer 34a that is located on the second side surface 12d, a longitudinal central portion of the second Sn plating layer 34b that is located on the first principal surface 12a, a longitudinal central portion of the second Sn plating layer 34b that is located on the second principal surface 12b, a longitudinal central portion of the second Sn plating layer 34b that is located on the first side surface 12c, and a longitudinal central portion of the second Sn plating layer 34b that is located on the second side surface 12d.

Where a dimension of the multilayer ceramic capacitor 10, which includes the multilayer body 12 and the outer electrodes 24, in the length direction z is an $L_M$ dimension, the $L_M$ dimension is preferably about 0.250 mm to about 3.450 mm, for example. Where a dimension of the multilayer ceramic capacitor 10, which includes the multilayer body 12 and the outer electrodes 24, in the width direction y is a $W_M$ dimension, the $W_M$ dimension is preferably about 0.125 mm to about 2.650 mm, for example. Where a dimension of the multilayer ceramic capacitor 10, which includes the multilayer body 12 and the outer electrodes 24, in the height direction x is a $T_M$ dimension, the $T_M$ dimension is preferably about 0.125 mm to about 2.650 mm, for example.

In the multilayer ceramic capacitor 10, the first resin outer electrode layer 26a directly covers about one half of the first end surface 12e and the second resin outer electrode layer 26b directly covers about one half of the second end surface 12f. This enables the region in which the resin outer electrode layer 26, which contains the thermosetting resin with high resistance, is disposed to be reduced over the outer electrodes 24 because the resin outer electrode layer 26 directly covers about one half of the first end surface 12e and about one half of the second end surface 12f. Therefore, ESR is able to be reduced over the outer electrodes 24. The resin outer electrode layer 26 is disposed directly on the multilayer body 12 and, therefore, the outer electrodes 24 are able to be reduced in thickness. Therefore, the multilayer body 12 is able to be designed such that a high-capacitance design is achieved. As a result, in the present preferred embodiment, the multilayer ceramic capacitor 10 is able to be provided such that cracking is able to be reduced or prevented, ESR is able to be reduced, and high capacitance is able to be achieved.

In the multilayer ceramic capacitor 10, the first base electrode layer 28a directly covers about another half of the first end surface 12e and the second base electrode layer 28b directly covers about another half of the second end surface 12f. This enables the region in which the resin outer electrode layer 26, which contains the thermosetting resin with high resistance, is disposed to be reduced over the outer electrodes 24. Therefore, ESR is able to be reduced over the outer electrodes 24. The resin outer electrode layer 26 need not be disposed on the base electrode layer 28 and, therefore, the outer electrodes 24 is able to be reduced in thickness. Therefore, the multilayer body 12 is able to be designed such that a high-capacitance design is achieved. As a result, in the present preferred embodiment, the multilayer ceramic capacitor 10 is able to be provided such that cracking is able to be reduced or prevented, ESR is able to be reduced, and high capacitance is able to be achieved.

In the multilayer ceramic capacitor 10, the first resin outer electrode layer 26a preferably extends from the first end surface 12e to a portion of the first principal surface 12a, a portion of the first side surface 12c, and a portion of the second side surface 12d and the second resin outer electrode layer 26b preferably extends from the second end surface 12f to a portion of the first principal surface 12a, a portion of the first side surface 12c, and a portion of the second side surface 12d. This enables the stress applied to a circuit board (the strain of the circuit board) to be relieved with the resin outer electrode layer 26, which is disposed on a portion of the first principal surface 12a, a portion of the first side surface 12c, and a portion of the second side surface 12d even when stress is induced by the impact of a fall of an electronic device provided with the multilayer ceramic capacitor 10 or flexure stress is induced by the expansion and contraction of the circuit board subjected to thermal cycles. Thus, cracks are able to be effectively reduced or prevented from occurring in the multilayer ceramic capacitor 10.

In the multilayer ceramic capacitor 10, the first base electrode layer 28a preferably extends from the first end surface 12e to a portion of the second principal surface 12b, a portion of the first side surface 12c, and a portion of the second side surface 12d and the second base electrode layer 28b preferably extends from the second end surface 12f to a portion of the second principal surface 12b, a portion of the first side surface 12c, and a portion of the second side surface 12d. This enables the base electrode layer 28 to have the enhanced ability to seal the multilayer body 12 and, therefore, enables the humidity resistance reliability of the multilayer ceramic capacitor 10 to be increased.

In the multilayer ceramic capacitor 10, the first outer electrode 24a further includes the first plating layer 30a, the first plating layer 30a covers the first resin outer electrode layer 26a and the first base electrode layer 28a, the second outer electrode 24b further includes the second plating layer 30b, and the second plating layer 30b covers the second resin outer electrode layer 26b and the second base electrode layer 28b. This enables the humidity resistance reliability of the first and second outer electrodes 24a and 24b to be increased and mountability during circuit board mounting to be increased.

A non-limiting example of a method for manufacturing multilayer ceramic capacitors 10 according to a preferred embodiment of the present invention is described below.

First, a ceramic paste containing a ceramic powder is formed into sheets by, for example, a screen printing process or the like, followed by drying, such that ceramic green sheets are prepared.

Next, a conductive paste for inner electrodes is applied to some of the ceramic green sheets by, for example, a screen printing process or the like so as to form a predetermined pattern, such that the ceramic green sheets provided with a conductive pattern for inner electrodes and the ceramic green sheets provided with no conductive pattern for inner electrodes are prepared. The ceramic paste and the conductive paste for inner electrodes may contain, for example, a known binder and/or solvent.

Next, a predetermined number of the ceramic green sheets provided with no conductive pattern for inner electrodes are stacked, the ceramic green sheets provided with the conductive pattern for inner electrodes are stacked in series thereon, and a predetermined number of the ceramic green sheets provided with no conductive pattern for inner electrodes are stacked on the ceramic green sheets provided with the conductive pattern for inner electrodes, such that a mother multilayer body is prepared.

The mother multilayer body may be pressed by a technique, such as isostatic pressing, in a stacking direction as required.

The mother multilayer body is cut into a plurality of green multilayer bodies with a predetermined shape and size. In this operation, edge sections and corner sections of the green multilayer bodies may be rounded by barrel polishing or the like.

The green multilayer bodies are fired, such that multilayer bodies 12 are completed. Each multilayer body 12 includes a first inner electrode layer 16a and a second inner electrode layer 16b. End portions of the first and second inner electrode layers 16a and 16b are extended to a first end surface 12e or second end surface 12f of the multilayer body 12. The firing temperature of the green multilayer bodies may be appropriately set depending on a ceramic material and conductive material used. The firing temperature of the green multilayer bodies may preferably be, for example, about 900° C. to about 1,300° C.

After firing, a conductive paste for outer electrodes 24 is applied to the multilayer body 12 so as to cover about one half of each of the first end surface 12e and the second end surface 12f, followed by baking, such that base electrode layers 28 of the outer electrodes 24 are formed. The baking temperature is preferably about 700° C. to about 900° C., for example.

A particular application method is as follows: the conductive paste for the outer electrodes 24 is applied to about half of each of the first end surface 12e and the second end surface 12f by a DIP process or a sputtering process using a tool with a mask covering about half of each of the first end surface 12e and the second end surface 12f. Alternatively, the conductive paste for the outer electrodes 24 may be applied to about half of each of the first end surface 12e and the second end surface 12f by a screen printing process using a screen including an opening corresponding to about half of each of the first end surface 12e and the second end surface 12f. Alternatively, after a solvent repelling the base electrode layers 28 is applied using a tool including a mask covering about half of each of the first end surface 12e and the second end surface 12f, the conductive paste for the outer electrodes 24 may be applied to about half of each of the first end surface 12e and the second end surface 12f by the DIP process.

Next, a conductive resin paste, containing a thermosetting resin and a metal component, for the resin outer electrode layer 26 is applied to the multilayer body 12 so as to cover about another half of each of the first end surface 12e and the second end surface 12f, followed by heat treatment preferably at a temperature of about 250° C. to about 550° C., for example, such that the thermosetting resin is thermally cured and the resin outer electrode layer 26 is formed. An atmosphere used in this operation is preferably a $N_2$ atmosphere, for example. In order to prevent the scattering of the thermosetting resin and the oxidation of the metal component, the concentration of oxygen is preferably reduced to about 100 ppm or less, for example.

A particular application method is as follows: the conductive resin paste for the resin outer electrode layer 26 is applied to about half of each of the first end surface 12e and the second end surface 12f by the DIP process or the sputtering process using a tool including a mask covering about half of each of the first end surface 12e and the second end surface 12f. Alternatively, the conductive resin paste for the resin outer electrode layer 26 may be applied to about half of each of the first end surface 12e and the second end surface 12f by the screen printing process using a mask including an opening corresponding to half of each of the first end surface 12e and the second end surface 12f. Alternatively, after a solvent repelling the base electrode layers 28 is applied using a tool having a mask covering about half of each of the first end surface 12e and the second end surface 12f, the conductive resin paste for the resin outer electrode layer 26 may be applied to about half of each of the first end surface 12e and the second end surface 12f by the DIP process.

Thereafter, plating layers 30 are formed on the base electrode layers 28 and the resin outer electrode layer 26. The plating layers 30 are formed by electroplating or electroless plating.

As described above, the multilayer ceramic capacitors 10 according to the present preferred embodiment are manufactured.

Figure 6:
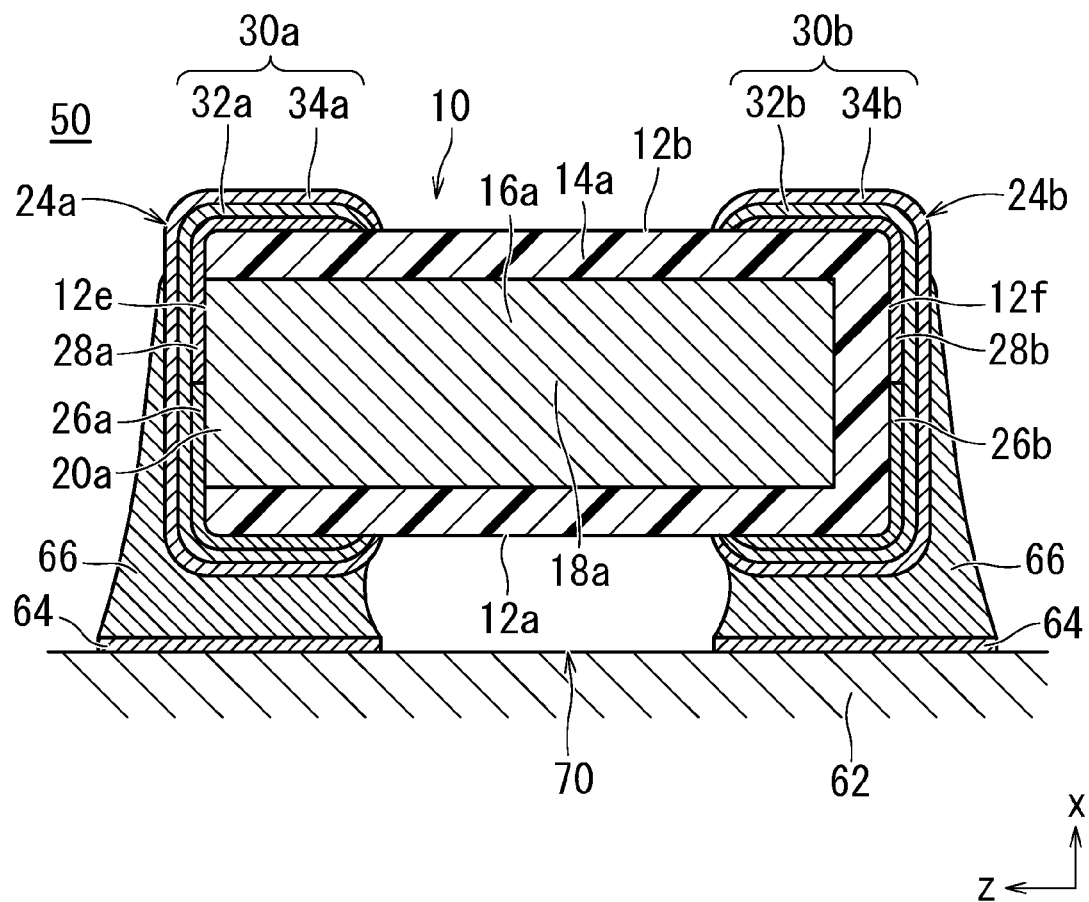
FIG. 6 is a vertical sectional view of a multilayer ceramic capacitor-mounting structure according to another preferred embodiment of the present invention.

A multilayer ceramic capacitor-mounting structure 50 according to a preferred embodiment of the present invention includes the multilayer ceramic capacitor 10 shown in FIG. 1 and a circuit board 60 on which the multilayer ceramic capacitor 10 is mounted. The multilayer ceramic capacitor-mounting structure 50 is described with reference to FIG. 6. FIG. 6 is a vertical sectional view of the multilayer ceramic capacitor-mounting structure 50. The same or substantially the same components as those shown in FIGS. 1 to 4 are denoted by the same reference numerals and descriptions similar to those of the multilayer ceramic capacitor 10 are not repeated.

The circuit board 60 includes a planarized core member 62 and mounting lands 64 disposed on a surface of the core member 62.

The core member 62 includes a glass epoxy substrate preferably made of, for example, material obtained by impregnating a base including a mixture of a glass cloth and a glass nonwoven fabric with an epoxy resin. The core member 62 preferably has a thickness of about 200 μm to about 1,600 μm, for example.

The mounting lands 64 are attached to one or both surfaces of the core member 62, which includes the glass epoxy substrate. The outer electrodes 24 of the multilayer ceramic capacitor 10 are mounted on the mounting lands 64 with a bonding material (solder) 66. The mounting lands 64 are preferably made of, for example, metal such as Cu, Ag, Pd, or Pt or an alloy containing such metal. In particular, mounting lands 64 are more preferably made of Cu, for example. The mounting lands 64 preferably have a thickness of about 15 μm to 150 μm, for example.

In the multilayer ceramic capacitor-mounting structure 50, the first and second inner electrode layers 16a and 16b of the multilayer ceramic capacitor 10 are parallel or substantially parallel to the side surface 1c and the second side surface 12d and perpendicular or substantially perpendicular to a mounting surface 70. In this arrangement, the first resin outer electrode layer 26a, which directly covers about one half of the first end surface 12e, is disposed on the mounting surface 70 side and the second resin outer electrode layer 26b, which directly covers about one half of the second end surface 12f, is disposed on the mounting surface 70 side. The first base electrode layer 28a, which directly covers about another half of the first end surface 12e, is disposed opposite to the mounting surface 70 and the second base electrode layer 28b, which directly covers about another half of the second end surface 12f, is disposed opposite to the mounting surface 70. Furthermore, the circuit board 60 is configured such that the mounting lands 64 are disposed on a surface of the core member 62 of the circuit board 60 and are connected to the first outer electrode 24a and the second outer electrode 24b with the bonding material 66.

In the multilayer ceramic capacitor-mounting structure 50, the resin outer electrode layer 26 is disposed on the mounting surface 70 side, thus enabling the stress applied to the circuit board 60 (the strain of the circuit board 60) to be reliably relieved with the resin outer electrode layer 26 even when stress is induced by drop impacts or flexure stress is induced by the expansion and contraction of the circuit board 60 subjected to thermal cycles. Thus, cracks are able to be reduced or prevented from occurring in the multilayer ceramic capacitor 10.

Since the inner electrode layers 16 are perpendicular or substantially perpendicular to the mounting surface 70, all of the extended electrode sections 20 are electrically continuous with the base electrode layers 28, which have high conductivity, thus enabling a reduction in capacitance due to poor contact to be reduced.

In the multilayer ceramic capacitor-mounting structure 50, the first resin outer electrode layer 26a preferably extends from the first end surface 12e to a portion of the first principal surface 12a, a portion of the first side surface 12c, and a portion of the second side surface 12d and the second resin outer electrode layer 26b preferably extends from the second end surface 12f to a portion of the first principal surface 12a, a portion of the first side surface 12c, and a portion of the second side surface 12d. This enables the stress applied to the circuit board 60 (the strain of the circuit board 60) to be relieved with the resin outer electrode layer 26, which is disposed on a portion of the first principal surface 12a, a portion of the first side surface 12c, and a portion of the second side surface 12d, even when stress is induced by the impact of a fall of an electronic device provided with the multilayer ceramic capacitor 10 or flexure stress is induced by the expansion and contraction of the circuit board 60 subjected to thermal cycles. Thus, cracks are able to be effectively reduced or prevented from occurring in the multilayer ceramic capacitor 10.

In the multilayer ceramic capacitor-mounting structure 50, the first base electrode layer 28a preferably extends from the first end surface 12e to a portion of the second principal surface 12b, a portion of the first side surface 12c, and a portion of the second side surface 12d and the second base electrode layer 28b preferably extends from the second end surface 12f to a portion of the second principal surface 12b, a portion of the first side surface 12c, and a portion of the second side surface 12d. This enables the base electrode layer 28 to have an improved ability to seal the multilayer body 12 and, therefore, enables the humidity resistance reliability of the multilayer ceramic capacitor 10 to be increased.

In the multilayer ceramic capacitor-mounting structure 50, the first outer electrode 24a further includes the first plating layer 30a that covers the first resin outer electrode layer 26a and the first base electrode layer 28a, and the second outer electrode 24b further includes the second plating layer 30b that covers the second resin outer electrode layer 26b and the second base electrode layer 28b. This enables the humidity resistance reliability of the first and second outer electrodes 24a and 24b to be increased and also enables mountability during circuit board mounting to be increased.

Multilayer ceramic capacitors were prepared by the above-described manufacturing method, were subjected to a bending test, and were measured for ESR and electrostatic capacitance. In an example of a preferred embodiment of the present invention, Ni plating layers and Sn plating layers were formed as plating layers. In comparative examples, the following samples were prepared and similarly tested: samples each including a base electrode layer extending over an end surface and a resin outer electrode layer, Ni plating layer, and Sn plating layer formed thereon.

Figure 7:
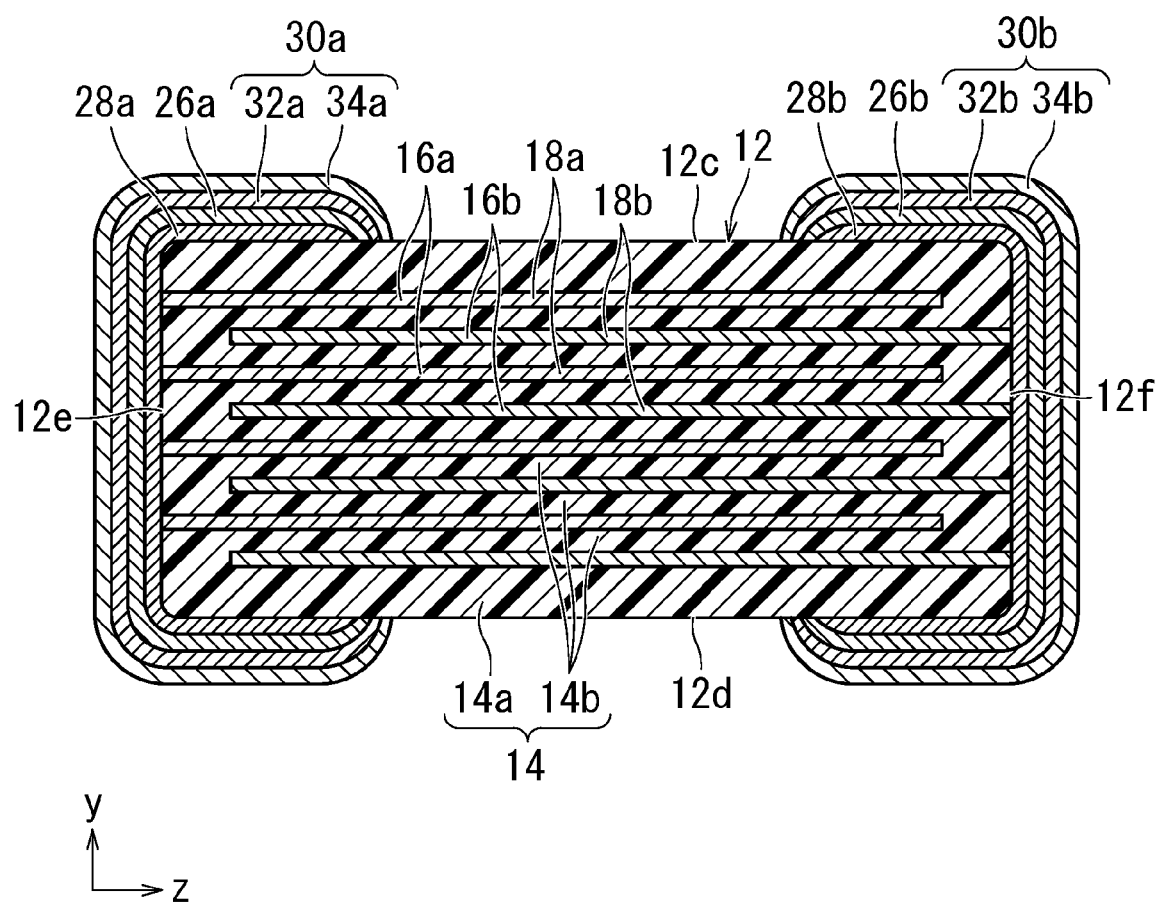
FIG. 7 is an LW sectional view of a known multilayer ceramic capacitor.

(1) Multilayer Ceramic Capacitor Prepared in Example
  (a) Standard dimensions of multilayer ceramic capacitor: $L_M \times W_M \times T_M$=about 1.17 mm×about 0.68 mm×about 0.68 mm
  (b) Dimensions of multilayer body of multilayer ceramic capacitor: L×W×T=about 1.136 mm×about 0.656 mm×about 0.656 mm
  (c) Dielectric layers: $BaTiO_3$
  (d) Inner electrode layers: Ni
  (e) Electrostatic capacitance: about 10.5 μF
  (f) Rated voltage: about 6.3 V
  (g) Structure of outer electrodes
    (i) A base electrode layer was formed on about half of a first end surface and a second end surface by a screen printing process using a mask tool including an opening corresponding to about half of the first end surface and the second end surface. A resin outer electrode layer was formed by the screen printing process such that after the base electrode layer was formed on about half of the first end surface and the second end surface, a mask including an opening corresponding to about half of the first end surface and the second end surface was aligned with the base electrode layer.
    (ii) Base electrode layer: an electrode layer containing a conductive metal (Cu) and a glass component
      The thickness of a central portion in a height direction located on each of the first end surface and the second end surface in a cross section at a ½ W position of the multilayer body: about 10 μm
      The thickness of a longitudinal central portion located on each of a first principal surface, a second principal surface, a first side surface, and a second side surface in the cross section at the ½ W position of the multilayer body: about 5 μm
    (iii) Resin outer electrode layer
      Conductive filler: Ag
      Thermosetting resin: epoxy
      Thermosetting temperature: about 250° C.
      The thickness of a central portion in a height direction located on each of the first end surface and the second end surface in the cross section at the ½ W position of the multilayer body: about 10 μm
      The thickness of a longitudinal central portion located on each of the first principal surface, the second principal surface, the first side surface, and the second side surface in the cross section at the ½ W position of the multilayer body: about 5 μm
    (iv) Plating layers: Both of a Ni plating layer and a Sn plating layer were formed.
      Ni plating layer: •The thickness of a central portion in a height direction located on each of the first end surface and the second end surface in the cross section at the ½ W position of the multilayer body: about 3.5 μm
      The thickness of a longitudinal central portion located on each of the first principal surface, the second principal surface, the first side surface, and the second side surface in the cross section at the ½ W position of the multilayer body: about 3.5 μm
      Sn plating layer: •The thickness of a central portion in a height direction located on each of the first end surface and the second end surface in the cross section at the ½ W position of the multilayer body: about 3.5 μm
      The thickness of a longitudinal central portion located on each of the first principal surface, the second principal surface, the first side surface, and the second side surface in the cross section at the ½ W position of the multilayer body: about 3.5 μm (2) Multilayer Ceramic Capacitor Prepared in Comparative Example 1
  (a) Standard dimensions of multilayer ceramic capacitor: $L_M \times W_M \times T_M$=about 1.17 mm×about 0.68 mm×about 0.68 mm
  (b) Dimensions of multilayer body of multilayer ceramic capacitor: L×W×T=about 1.056 mm×about 0.646 mm×about 0.646 mm
  (c) Dielectric layers: $BaTiO_3$
  (d) Inner electrode layers: Ni
  (e) Electrostatic capacitance: about 9.5 μF
  (f) Rated voltage: about 6.3 V
  (g) Structure of outer electrodes: refer to FIG. 7
    (i) Base electrode layer: an electrode layer containing a conductive metal (Cu) and a glass component
      The thickness of a central portion in a height direction located on each of a first end surface and a second end surface in a cross section at a ½ W position of the multilayer body: about 20 μm
      The thickness of a longitudinal central portion located on each of a first principal surface, a second principal surface, a first side surface, and a second side surface in the cross section at a ½ W position of the multilayer body: about 5 μm
    (ii) Resin outer electrode layer
      Conductive filler: Ag
      Thermosetting resin: epoxy
      Thermosetting temperature: about 250° C.
      The thickness of a central portion in a height direction located on each of the first end surface and the second end surface in the cross section at the ½ W position of the multilayer body: about 30 μm
      The thickness of a longitudinal central portion located on each of the first principal surface, the second principal surface, the first side surface, and the second side surface in the cross section at the ½ W position of the multilayer body: about 5 μm
    (iii) Plating layers: Both of a Ni plating layer and a Sn plating layer were formed.
      Ni plating layer: •The thickness of a central portion in a height direction located on each of the first end surface and the second end surface in the cross section at the ½ W position of the multilayer body: about 3.5 μm
      The thickness of a longitudinal central portion located on each of the first principal surface, the second principal surface, the first side surface, and the second side surface in the cross section at the ½ W position of the multilayer body: about 3.5 μm
      Sn plating layer: •The thickness of a central portion in a height direction located on each of the first end surface and the second end surface in the cross section at the ½ W position of the multilayer body: about 3.5 μm
      The thickness of a longitudinal central portion located on each of the first principal surface, the second principal surface, the first side surface, and the second side surface in the cross section at the ½ W position of the multilayer body: about 3.5 μm (3) Multilayer Ceramic Capacitor Prepared in Comparative Example 2 (A Usual Multilayer Ceramic Capacitor Including a Base Electrode Layer and Plating Layers)

(a) Standard dimensions of multilayer ceramic capacitor: $L_M \times W_M \times T_M$=about 1.17 mm×about 0.68 mm×about 0.68 mm
(b) Dimensions of multilayer body of multilayer ceramic capacitor: L×W×T=about 1.056 mm×about 0.646 mm×about 0.646 mm
(c) Dielectric layers: $BaTiO_3$
(d) Inner electrode layers: Ni
(e) Electrostatic capacitance: about 10.0 μF
(f) Rated voltage: about 6.3 V
(g) Structure of outer electrodes:
(i) Base electrode layer: an electrode layer containing a conductive metal (Cu) and a glass component
The thickness of a central portion in a height direction located on each of a first end surface and a second end surface in a cross section at a ½ W position of the multilayer body: about 30 μm
The thickness of a longitudinal central portion located on each of a first principal surface, a second principal surface, a first side surface, and a second side surface in the cross section at a ½ W position of the multilayer body: about 7 μm
(ii) Plating layers: Both of a Ni plating layer and a Sn plating layer were formed.
Ni plating layer: •The thickness of a central portion in a height direction located on each of the first end surface and the second end surface in the cross section at the ½ W position of the multilayer body: about 3.5 μm
The thickness of a longitudinal central portion located on each of the first principal surface, the second principal surface, the first side surface, and the second side surface in the cross section at the ½ W position of the multilayer body: about 3.5 μm
Sn plating layer: •The thickness of a central portion in a height direction located on each of the first end surface and the second end surface in the cross section at the ½ W position of the multilayer body: about 3.5 μm
The thickness of a longitudinal central portion located on each of the first principal surface, the second principal surface, the first side surface, and the second side surface in the cross section at the ½ W position of the multilayer body: about 3.5 μm Table 1 shows measurements of the multilayer ceramic capacitors prepared in the example, Comparative Example 1, and Comparative Example 2.

TABLE 1

| | | Comparative Example 1 | Comparative Example 2 | Example |
|---|---|---|---|---|
| Outside dimensions (mm) | $L_M$ | 1.17 | 1.17 | 1.17 |
| | $W_M$ | 0.68 | 0.68 | 0.68 |
| | $T_M$ | 0.68 | 0.68 | 0.68 |
| Dimensions of multilayer body (mm) | L | 1.056 | 1.096 | 1.136 |
| | W | 0.646 | 0.652 | 0.656 |
| | T | 0.646 | 0.652 | 0.656 |
| Thickness of base electrode layer (one side) (μm) | x | 20 | 30 | 10 |
| | y | 5 | 7 | 5 |
| | z | 5 | 7 | 5 |
| Thickness of resin electrode layer (one side) (μm) | x | 30 | | 10 |
| | y | 5 | | 5 |
| | z | 5 | | 5 |
| Thickness of Ni plating layer (one side) (μm) | x | 3.5 | 3.5 | 3.5 |
| | y | 3.5 | 3.5 | 3.5 |
| | z | 3.5 | 3.5 | 3.5 |
| Thickness of Sn plating layer (one side) (μm) | x | 3.5 | 3.5 | 3.5 |
| | y | 3.5 | 3.5 | 3.5 |
| | z | 3.5 | 3.5 | 3.5 |

TABLE 1-continued

| | Comparative Example 1 | Comparative Example 2 | Example |
|---|---|---|---|
| Thickness of outer layer (μm) | 40 | 40 | 40 |
| Size of L gap (μm) | 44 | 44 | 44 |
| Size of W gap (μm) | 45 | 45 | 45 |
| Effective area (mm²) | 0.538 | 0.566 | 0.593 |
| Thickness of dielectric layer (μm) | 0.75 | 0.75 | 0.75 |
| Effective coverage | 100% | 100% | 100% |
| Thickness of inner electrode (μm) | 0.61 | 0.63 | 0.63 |
| Number of stacked layers (n − 1) | 416 | 416 | 417 |
| Effective volume (mm³) | 0.3046 | 0.3240 | 0.3417 |

The observation of cracks by the bending test, the measurement of ESR, and the measurement of electrostatic capacitance were performed by methods below.
(1) Observation of Cracks by Bending Test
Each multilayer ceramic capacitor was mounted on a circuit board using a solder paste. For a sample provided with a resin outer electrode layer, a side provided with the resin outer electrode layer was defined as a mounting surface. The circuit board was bent from an unmounted board surface using a push rod with a diameter of about 5 μm, such that mechanical stress was applied to the circuit board. In this operation, the circuit board was strained at a strain of about 8 mm for about 5 seconds. After the circuit board was bent, the multilayer ceramic capacitor was detached from the circuit board, was polished perpendicular or substantially perpendicular to the mounting surface (that is, along an LT surface), and was then observed for cracks.
(2) Method for Measuring ESR
ESR was measured such that each multilayer ceramic capacitor was heat-treated at about 150° C. for about 1 hour in an air atmosphere before being measured, was mounted on a circuit board for measurement, and was measured at a measurement frequency of about 1 MHz using a network analyzer, Keysight E5071C, after about 24±2 hours from the completion of heat treatment.
(3) Method for Measuring Electrostatic Capacitance
The electrostatic capacitance of each multilayer ceramic capacitor was measured under measurement conditions based on Japan Industrial Standards (JIS C 5101-1998) using a capacitance meter (LCR meter).
Table 2 shows the results of the bending test and measurement results of ESR and electrostatic capacitance.

TABLE 2

| | Raw material | Frequency | ESR [Ω] | Incidence of cracks | Electrostatic capacitance [μF] |
|---|---|---|---|---|---|
| Comparative Example 1 | $BaTiO_3$ | 1 MHz | 0.02 | 0/10 | 9.5 |
| Comparative Example 2 | | | 0.005 | 4/10 | 10.0 |
| Example | | | 0.005 | 0/10 | 10.5 |

As shown in Table 2, in a comparison between the multilayer ceramic capacitor prepared in the example and the multilayer ceramic capacitor prepared in Comparative Example 1, the ESR of the multilayer ceramic capacitor prepared in the example was lower than the ESR of the multilayer ceramic capacitor prepared in Comparative Example 1 and the electrostatic capacitance of the multilayer ceramic capacitor prepared in the example was higher than the electrostatic capacitance of the multilayer ceramic capacitor prepared in Comparative Example 1. In a comparison between the multilayer ceramic capacitor prepared in the example and the multilayer ceramic capacitor prepared in Comparative Example 2, the incidence of cracks in the multilayer ceramic capacitor prepared in the example was less than the incidence of cracks in the multilayer ceramic capacitor prepared in Comparative Example 2 as measured by the bending test and the electrostatic capacitance of the multilayer ceramic capacitor prepared in the example was higher than the electrostatic capacitance of the multilayer ceramic capacitor prepared in Comparative Example 2.

From the above results, since the resin outer electrode layer provided in the example directly covers about half of the first end surface and about half of the second end surface, a region in which the resin outer electrode layer, which contains a thermosetting resin with high resistance, is disposed is able to be reduced over the outer electrodes as compared to Comparative Example 1. Therefore, ESR is able to be reduced over the outer electrodes.

Since the resin outer electrode layer and base electrode layer in the example are directly disposed on the multilayer body, the outer electrodes are able to be reduced in thickness as compared to Comparative Example 1. Therefore, the multilayer body is able to be designed such that a high-capacitance design is achieved.

Since the resin outer electrode layer in the example directly covers about half of the first end surface and about half of the second end surface, even when stress is induced by drop impacts or flexure stress is induced by the expansion and contraction of a circuit board subjected to thermal cycles, the stress applied to the circuit board (the strain of the circuit board) to be relieved with the resin outer electrode layer as compared to Comparative Example 2. Thus, cracks are able to be effectively reduced or prevented from occurring in the multilayer ceramic capacitor.

Since the resin outer electrode layer in the example directly covers about one half of the first end surface and about one half of the second end surface and the base electrode layer in the example directly covers a corresponding one of about another half of the first end surface and about another half of the second end surface, the base electrode layer need not have a large thickness and the outer electrodes is able to be reduced in thickness as compared to Comparative Example 2. Thus, the multilayer body is able to be designed such that a high-capacitance design is achieved.

As a result, in preferred embodiments of the present invention, multilayer ceramic capacitors and multilayer ceramic capacitor-mounting structures are able to be provided such that cracking is able to be reduced or prevented, ESR is able to be reduced, and high capacitance is able to be achieved.

The present invention is not limited to the above preferred embodiments and various modifications may be made within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a plurality of stacked dielectric layers, a first principal surface, a second principal surface facing the first principal surface in a height direction, a first side surface, a second side surface facing the first side surface in a width direction perpendicular or substantially perpendicular to the height direction, a first end surface, and a second end surface facing the first end surface in a length direction perpendicular or substantially perpendicular to the height direction and the width direction;
a plurality of first inner electrode layers alternately stacked with the plurality of dielectric layers and exposed on the first end surface;
a plurality of second inner electrode layers alternately stacked with the plurality of dielectric layers and exposed on the second end surface;
a first outer electrode connected to the first inner electrode layers and disposed on the first end surface; and
a second outer electrode connected to the second inner electrode layers and disposed on the second end surface; wherein
the first outer electrode includes a first resin outer electrode layer containing a thermosetting resin and a conductive filler, and a first base electrode layer containing glass and a conductive metal;
the second outer electrode includes a second resin outer electrode layer containing a thermosetting resin and a conductive filler, and a second base electrode layer containing glass and a conductive metal;
the first resin outer electrode layer directly covers about one half of the first end surface;
the second resin outer electrode layer directly covers about one half of the second end surface;
the first base electrode layer directly covers about another half of the first end surface; and
the second base electrode layer directly covers about another half of the second end surface.

2. The multilayer ceramic capacitor according to claim 1, wherein
the first resin outer electrode layer extends from the first end surface to a portion of the first principal surface, a portion of the first side surface, and a portion of the second side surface; and
the second resin outer electrode layer extends from the second end surface to a portion of the first principal surface, a portion of the first side surface, and a portion of the second side surface.

3. The multilayer ceramic capacitor according to claim 1, wherein
the first base electrode layer extends from the first end surface to a portion of the second principal surface, a portion of the first side surface, and a portion of the second side surface; and
the second base electrode layer extends from the second end surface to a portion of the second principal surface, a portion of the first side surface, and a portion of the second side surface.

4. The multilayer ceramic capacitor according to claim 1, wherein
the first outer electrode further includes a first plating layer covering the first resin outer electrode layer and the first base electrode layer; and
the second outer electrode further includes a second plating layer covering the second resin outer electrode layer and the second base electrode layer.

5. The multilayer ceramic capacitor according to claim 1, wherein
a thickness of a central portion of the first resin outer electrode layer on the first end surface is about 5 μm to about 30 μm; and a thickness of a central portion of the second resin outer electrode layer on the second end surface is about 5 μm to about 30 μm.

6. The multilayer ceramic capacitor according to claim 1, wherein the thermosetting resin in each of the first and second resin outer electrode layers is at least one of an epoxy resin, a phenol resin, a urethane resin, a silicone resin, and a polyimide resin.

7. The multilayer ceramic capacitor according to claim 1, wherein the conductive filler in each of the first and second resin outer electrode layers is at least one of Ag, Cu, an alloy of Ag, and an alloy of Cu.

8. The multilayer ceramic capacitor according to claim 1, wherein
 a thickness of a central portion of the first base electrode layer on the first end surface is about 5 μm to about 30 μm; and
 a thickness of a central portion of the second base electrode layer on the second end surface is about 5 μm to about 30 μm.

9. The multilayer ceramic capacitor according to claim 1, wherein the glass in each of the first and second base electrode layers includes B, Si, Ba, Mg, Al, and Li.

10. The multilayer ceramic capacitor according to claim 1, wherein the conductive metal in each of the first and second resin outer electrode layers is at least one of Cu, Ni, Ag, Pd, an Ag—Pd alloy, and Au.

11. A multilayer ceramic capacitor-mounting structure comprising:
 a multilayer ceramic capacitor including:
  a multilayer body including a plurality of stacked dielectric layers, a first principal surface, a second principal surface facing the first principal surface in a height direction, a first side surface, a second side surface facing the first side surface in a width direction perpendicular or substantially perpendicular to the height direction, a first end surface, and a second end surface facing the first end surface in a length direction perpendicular or substantially perpendicular to the height direction and the width direction;
  a plurality of first inner electrode layers alternately stacked with the plurality of dielectric layers and exposed on the first end surface;
  a plurality of second inner electrode layers alternately stacked with the plurality of dielectric layers and exposed on the second end surface;
  a first outer electrode connected to the first inner electrode layers and disposed on the first end surface; and
  a second outer electrode connected to the second inner electrode layers and disposed on the second end surface; wherein
  the first outer electrode includes a first resin outer electrode layer containing a thermosetting resin and a conductive filler, and a first base electrode layer containing glass and a conductive metal;
  the second outer electrode includes a second resin outer electrode layer containing a thermosetting resin and a conductive filler, and a second base electrode layer containing glass and a conductive metal;
  the first resin outer electrode layer directly covers about one half of the first end surface;
  the second resin outer electrode layer directly covers one half of the second end surface;
  the first base electrode layer directly covers about another half of the first end surface; and
  the second base electrode layer directly covers about another half of the second end surface; and
 a circuit board on which the multilayer ceramic capacitor is mounted; wherein
 the first inner electrode layers and the second inner electrode layers are in parallel or substantially in parallel to the first side surface and the second side surface and perpendicular or substantially perpendicular to a mounting surface;
 the first resin outer electrode layer is disposed on a side of the mounting surface;
 the second resin outer electrode layer is disposed on a side of the mounting surface;
 the first base electrode layer is disposed opposite to the mounting surface;
 the second base electrode layer is disposed opposite to the mounting surface;
 the circuit board includes a core member and mounting lands provided on a surface of the core member; and
 the mounting lands are connected to the first outer electrode and the second outer electrode with a bonding material.

12. The multilayer ceramic capacitor-mounting structure according to claim 11, wherein
 the first resin outer electrode layer extends from the first end surface to a portion of the first principal surface, a portion of the first side surface, and a portion of the second side surface; and
 the second resin outer electrode layer extends from the second end surface to a portion of the first principal surface, a portion of the first side surface, and a portion of the second side surface.

13. The multilayer ceramic capacitor-mounting structure according to claim 11, wherein
 the first base electrode layer extends from the first end surface to a portion of the second principal surface, a portion of the first side surface, and a portion of the second side surface; and
 the second base electrode layer extends from the second end surface to a portion of the second principal surface, a portion of the first side surface, and a portion of the second side surface.

14. The multilayer ceramic capacitor-mounting structure according to claim 11, wherein
 the first outer electrode further includes a first plating layer covering the first resin outer electrode layer and the first base electrode layer; and
 the second outer electrode further includes a second plating layer covering the second resin outer electrode layer and the second base electrode layer.

15. The multilayer ceramic capacitor-mounting structure according to claim 11, wherein
 a thickness of a central portion of the first resin outer electrode layer on the first end surface is about 5 μm to about 30 μm; and
 a thickness of a central portion of the second resin outer electrode layer on the second end surface is about 5 μm to about 30 μm.

16. The multilayer ceramic capacitor-mounting structure according to claim 11, wherein the thermosetting resin in each of the first and second resin outer electrode layers is at least one of an epoxy resin, a phenol resin, a urethane resin, a silicone resin, and a polyimide resin.

17. The multilayer ceramic capacitor-mounting structure according to claim 11, wherein the conductive filler in each of the first and second resin outer electrode layers is at least one of Ag, Cu, an alloy of Ag, and an alloy of Cu.

18. The multilayer ceramic capacitor-mounting structure according to claim 11, wherein
a thickness of a central portion of the first base electrode layer on the first end surface is about 5 μm to about 30 μm; and
a thickness of a central portion of the second base electrode layer on the second end surface is about 5 μm to about 30 μm.

19. The multilayer ceramic capacitor-mounting structure according to claim 11, wherein the glass in each of the first and second base electrode layers includes B, Si, Ba, Mg, Al, and Li.

20. The multilayer ceramic capacitor-mounting structure according to claim 11, wherein the conductive metal in each of the first and second resin outer electrode layers is at least one of Cu, Ni, Ag, Pd, an Ag—Pd alloy, and Au.

* * * * *